United States Patent
Shuey et al.

[19]

[11] Patent Number: 6,073,169
[45] Date of Patent: Jun. 6, 2000

[54] AUTOMATIC METER READING SYSTEM EMPLOYING COMMON BROADCAST COMMAND CHANNEL

[75] Inventors: Kenneth C. Shuey; Kathryn J. Smith; David C. Lawrence; Arnold W. Bragg, all of Raleigh, N.C.

[73] Assignee: ABB Power T&D Company Inc., Raleigh, N.C.

[21] Appl. No.: 08/835,261

[22] Filed: Apr. 8, 1997

[51] Int. Cl.⁷ .......................... G06F 15/16; G06F 15/177
[52] U.S. Cl. .......................... 709/217; 709/218; 709/220; 709/235; 340/870.02; 340/870.03
[58] Field of Search .................. 395/200.47, 200.48, 395/200.49, 200.65; 340/870.02, 870.03; 709/217, 218, 220, 235

[56] References Cited

U.S. PATENT DOCUMENTS

| | | |
|---|---|---|
| 4,190,800 | 2/1980 | Kelly, Jr. et al. . |
| 4,322,842 | 3/1982 | Martinez ................................. 370/204 |
| 4,361,851 | 11/1982 | Asip et al. . |
| 4,396,915 | 8/1983 | Farnsworth et al. ............... 340/870.03 |
| 4,513,415 | 4/1985 | Martinez . |
| 4,628,313 | 12/1986 | Gombrich et al. . |
| 4,680,704 | 7/1987 | Konicek et al. . |
| 4,692,761 | 9/1987 | Robinton . |
| 4,713,837 | 12/1987 | Gordon . |
| 4,724,435 | 2/1988 | Moses et al. . |
| 4,728,950 | 3/1988 | Hendrickson et al. . |
| 4,734,680 | 3/1988 | Gehman et al. . |
| 4,799,059 | 1/1989 | Grindahl et al. . |
| 4,804,938 | 2/1989 | Rouse et al. . |
| 4,922,518 | 5/1990 | Gordon et al. . |
| 4,940,976 | 7/1990 | Gastouniotis et al. . |
| 5,056,107 | 10/1991 | Johnson et al. . |
| 5,239,575 | 8/1993 | White et al. . |
| 5,381,462 | 1/1995 | Larson et al. . |
| 5,432,507 | 7/1995 | Mussino et al. . |
| 5,438,329 | 8/1995 | Gastouniotis et al. . |
| 5,448,230 | 9/1995 | Schanker et al. . |
| 5,481,259 | 1/1996 | Bane . |
| 5,493,287 | 2/1996 | Bane . |
| 5,495,239 | 2/1996 | Ouellette . |
| 5,519,388 | 5/1996 | Adair, Jr. . |
| 5,528,507 | 6/1996 | McNamara et al. . |
| 5,541,589 | 7/1996 | Delaney . |
| 5,544,036 | 8/1996 | Brown, Jr. et al. . |
| 5,548,633 | 8/1996 | Kujawa et al. . |
| 5,590,179 | 12/1996 | Shincovich et al. . |
| 5,673,252 | 9/1997 | Johnson et al. .......................... 370/449 |
| 5,719,564 | 2/1998 | Sears ................................. 340/870.02 |
| 5,801,643 | 9/1998 | Williams et al. .................. 340/870.02 |

FOREIGN PATENT DOCUMENTS

682196 A5  7/1993  Switzerland .

*Primary Examiner*—Krisna Lim
*Attorney, Agent, or Firm*—Woodcock Washburn Kurtz Mackiewicz & Norris LLP

[57] ABSTRACT

An automated meter reading system is provided. The system includes a host server interfaced to a plurality of nodes where each node communicates with a number of utility meters. The system selects a group of noninterfering nodes and uses an RF broadcast from the host server to initiate the reading of meters and the uploading of meter data provided by those meters to the nodes and, ultimately, to the host server. The system also has a number of gateways that communicate with a plurality of nodes, grouped to form sets of noninterfering gateways. In this embodiment, the system selects a set of noninterfering gateways and uses an RF broadcast from the host server to initiate the reading of meters and the uploading of meter data provided by those meters to the nodes and, ultimately, through the gateways to the host server. A method for using an outbound RF channel to automatically read meters is also provided.

10 Claims, 8 Drawing Sheets

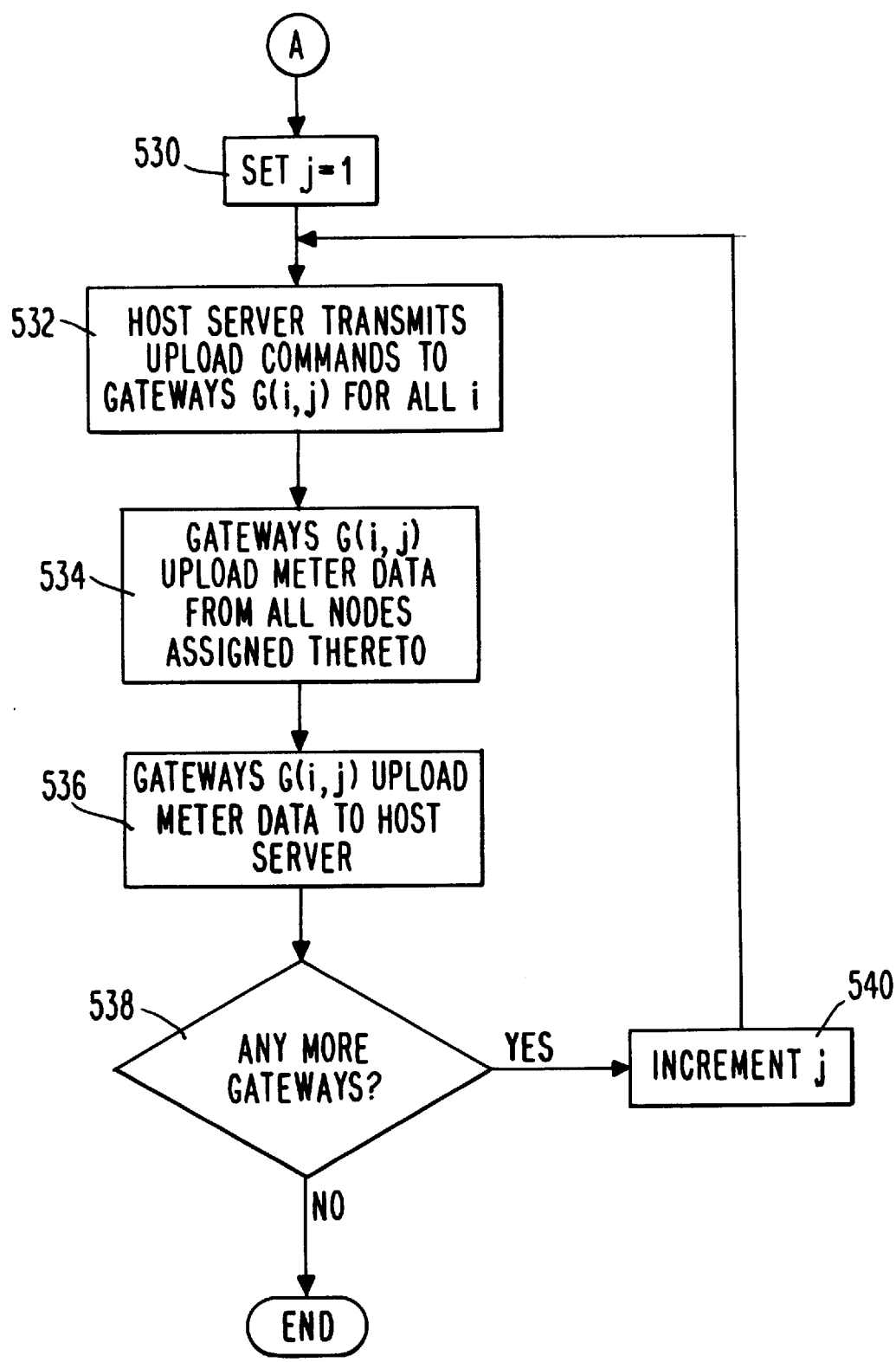

AUTOMATIC METER READING SYSTEM EMPLOYING COMMON BROADCAST COMMAND CHANNEL

FIELD OF THE INVENTION

The present invention relates to automatic meter reading. More particularly, the present invention relates to an automated system for remotely monitoring a plurality of utility meters on command from a host server via an RF outbound broadcast.

BACKGROUND OF THE INVENTION

Historically, meters measuring electrical energy, water flow, gas usage, and the like have used measurement devices, which mechanically monitor the subscriber's usage and display a reading of the usage at the meter itself. Consequently, the reading of these meters has required that human meter readers physically go to the site of the meter and manually document the readings. Clearly, this approach relies very heavily on human intervention and, thus, is very costly, time-consuming, and prone to human error. As the number of meters in a typical utility's service region has increased, in some cases into the millions, human meter reading has become prohibitive in terms of time and money.

In response, various sensing devices have been developed to automatically read utility meters and store the meter data electronically. These sensing devices, usually optical, magnetic, or photoelectric in nature, are coupled to the meter to record the meter data. Additionally, the meters have been equipped with radio frequency (RF) transceivers and control devices which enable the meters to transmit meter data over an RF link when requested to do so. Hand-held devices have been developed which include RF transceivers designed to interface with the meters' RF transceivers. These hand-held devices enable the human meter reader to simply walk by the meter's location, transmit a reading request over an RF link from the hand-held device to the meter's receiving device, wait for a response from the meter's sensing and transmitting device, and then record, manually or electronically, the meter data.

Similarly, meter reading devices have been developed for drive-by reading systems. Utility vans are equipped with RF transceivers similar to those described in the hand-held example above. The human meter reader drives by the subscriber's location, with an automated reading system in the utility van. Again, the meters are commanded to report the meter data, which is received in the van via an RF link, where the data is recorded electronically. While this methodology improves upon the previous approaches, it still requires a significant amount of human intervention and time.

Recently, there has been a concerted effort to accomplish meter reading by installing fixed communication networks that would allow data to flow from the meter all the way to the host system without human intervention. These fixed communications networks can operate using wire line or radio technology.

FIG. 1 shows a conventional fixed communication network for automated meter reading (AMR) technology. As shown in FIG. 1, a fixed communication network having wire line technology in which utility meters 10 are connected to a wide area network (WAN) 16 consisting of a suitable communications medium, including ordinary telephone lines, or the power lines that feed the meters themselves. The meters 10 are equipped with sensor and control devices 14, which are programmed to periodically read the meters and transmit the meter data to the utility's central computer 18 over the WAN 16.

One disadvantage of this approach has been that when a number of meters transmit meter data nearly simultaneously, the inherent latency on the wide area network results in packet collisions, lost data, garbled data, and general degradation of integrity across the system. To compensate for the collisions and interference between data packets destined for the central computer, due to the latency inherent in the WAN, various management schemes have been employed to ensure reliable delivery of the meter data. However, while this approach may be suitable for small systems, it does not serve the needs of a utility which monitors thousands or even millions of meters.

In an attempt to better manage the traffic in the WAN, approaches have been developed wherein meter control devices similar to those described above have been programmed to transmit meter data in response to commands received from the central computer via the WAN. By limiting the number of meter reading commands transmitted at a given time, the central computer controls the volume of data transmitted simultaneously. However, the additional WAN traffic further aggravated the degradation of data integrity due to various WAN latency effects. Thus, while these approaches may serve to eliminate the need for human meter readers, reliance on the WAN has proven these approaches to be unsatisfactory for servicing the number of meters in the typical service region.

Consequently, radio technology has tended to be the medium of choice due to its higher data rates and independence of the distribution network. The latest evolution of automated meter reading systems have made use of outbound RF communications from a fixed source (usually the utility's central station), directly to RF receivers mounted on the meters. The meters are also equipped with control devices which initiate the transfer of meter data when commanded to do so by the fixed source. The meters respond via a WAN as in the previous wire-based example. One disadvantage of these approaches is that there is still far too much interference on the WAN when all of the meters respond at about the same time. Thus, while these approaches reduce some of the WAN traffic (by eliminating outbound commands over the WAN), they are still unable to accommodate the large number of meters being polled.

It is worthy of note that the wire-based systems typically use a single frequency channel and allow the impedance and transfer characteristics of the transformers in the substation to prevent injection equipment in one station from interfering with receivers in another station. This built-in isolation in the network makes time division multiplexing less critical than for radio based metering systems. Typical fixed network radio systems also utilize a single channel to read all meters but the systems do not have a natural blocking point similar to the substation transformer utilized by distribution line carrier (DLC) networks. Also, the latency inherent in the WAN has contributed significantly to the problems associated with time division multiplexing a single frequency communications system. As a result, the systems require sophisticated management schemes to time division multiplex the channel for optimal utilization.

Changes to the network (e.g., adding a meter) or operating conditions (e.g., temperature, other WAN traffic) have exacerbated the problems associated with narrowband interference, causing information to be lost in transit to the utility's central station. Thus, a system designed to service hundreds of thousands of meters must also include the capability to keep track of changes in the network, and adapt to those changes efficiently.

Therefore, a need exists to provide a system whereby a utility company can reliably and rapidly read on the order of one million meters in the absence of any significant human intervention. Further, a need exists to provide such a system which accommodates changes to the network as well as changes in operating conditions without significant degradation of performance.

SUMMARY OF THE INVENTION

The present invention fulfills these needs by providing an automated meter reading system having a host server interfaced to a plurality of nodes, each node communicating with a number of utility meters. In a preferred embodiment, the system has a selection means for selecting a group of noninterfering nodes; and an outbound RF broadcast channel from the host server for communicating with the selected group to initiate the reading of meters that communicate with those nodes and the uploading of meter data provided by those meters to those nodes. This outbound RF broadcast channel can be an existing channel currently being used for demand side management. In a preferred embodiment, the system also has a two-way communication link over a wide area network between the host server and each of the nodes. In a more preferred embodiment, the host server receives meter data read from at least one million meters in no more than about five minutes.

In yet another preferred embodiment, the system also has a number of gateways, each communicating with a plurality of nodes, grouped to form sets of noninterfering gateways. In this embodiment, the system also has a selection means for selecting one of the sets of noninterfering gateways, and a second outbound RF broadcast channel from the host server for communicating with the selected set to initiate uploading of meter data from the selected set to the host server. This second outbound RF broadcast channel can be an existing channel currently being used for demand side management.

The present invention further fulfills these needs by providing a method for using an outbound RF channel to automatically read meters. In a preferred embodiment, the method comprises the steps of: defining a number of groups of noninterfering nodes; selecting a first group; broadcasting a read command to each node in the first group; selecting a second group; and broadcasting a read command to each node in the second group.

In another embodiment, the method further comprises the steps of: reading meter data, in response to the read command, from each meter communicating with the node receiving the read command; recording the meter data in a data storage means associated with that node; broadcasting an upload message to each node in the first group; uploading the meter data recorded in the data storage means associated with the nodes of the first group to the host server; broadcasting an upload message to each node in the second group; and uploading the meter data recorded in the data storage means associated with nodes of the second group to the host server.

In yet another embodiment, at least some of the nodes communicate through one of a number of gateways to the host server. In this embodiment, the method further comprises the steps of: selecting a first set of noninterfering gateways; broadcasting an upload message to each gateway in the first set; uploading the meter data recorded in the data storage means associated with the nodes that communicate with the first set of noninterfering gateways to the host server; selecting a second set of noninterfering gateways; broadcasting an upload message to each gateway in the second set; uploading the meter data recorded in the data storage means associated with nodes that communicate with the second set of noninterfering gateways to the host server.

The present invention further fulfills the aforementioned needs by providing an automated meter reading system wherein the host server maintains a topology database in which each meter is assigned to at least one node, each node is assigned to at least one gateway. The nodes are preferably grouped together to define groups of noninterfering nodes and the gateways are preferably grouped together to define sets of noninterfering gateways.

In another preferred embodiment, each of the plurality of nodes is adapted to receive RF broadcasts and the host server sequentially broadcasts a communication over an RF channel to each group of noninterfering nodes to initiate meter reading. In yet another preferred embodiment, each of the plurality of gateways is adapted to receive RF broadcasts and the host server sequentially broadcasts an upload message over a second RF channel to each set of noninterfering gateways, the gateways uploading the meter data to the host server via a wide area network in response to the upload message.

The present invention further fulfills these needs by providing a method of automatically reading a plurality of meters in an AMR system comprising the steps of: selecting one of the nodes designated to communicate with each gateway; grouping the selected nodes to form groups of noninterfering nodes; forming sets of gateways such that each gateway within one set has an individual gateway designator; maintaining a topology database that uniquely identifies for each meter the set, gateway and node designators associated with said meter; and reading the meters based on the set, gateway and node designators.

In another preferred embodiment, the method further comprises the step of initiating meter reading by sequentially broadcasting a read message over an RF channel to each group of noninterfering nodes. In yet another preferred embodiment, the method further comprises the step of initiating the uploading of meter data by sequentially broadcasting an upload message over the RF channel to each group of noninterfering nodes.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 8 shows the process by which a host server commands nodes and gateways to upload meter data by using groups of noninterfering gateways in accordance with a preferred embodiment of the present invention.

DETAILED DESCRIPTION OF THE PREFERRED EMBODIMENT

Figure 1:
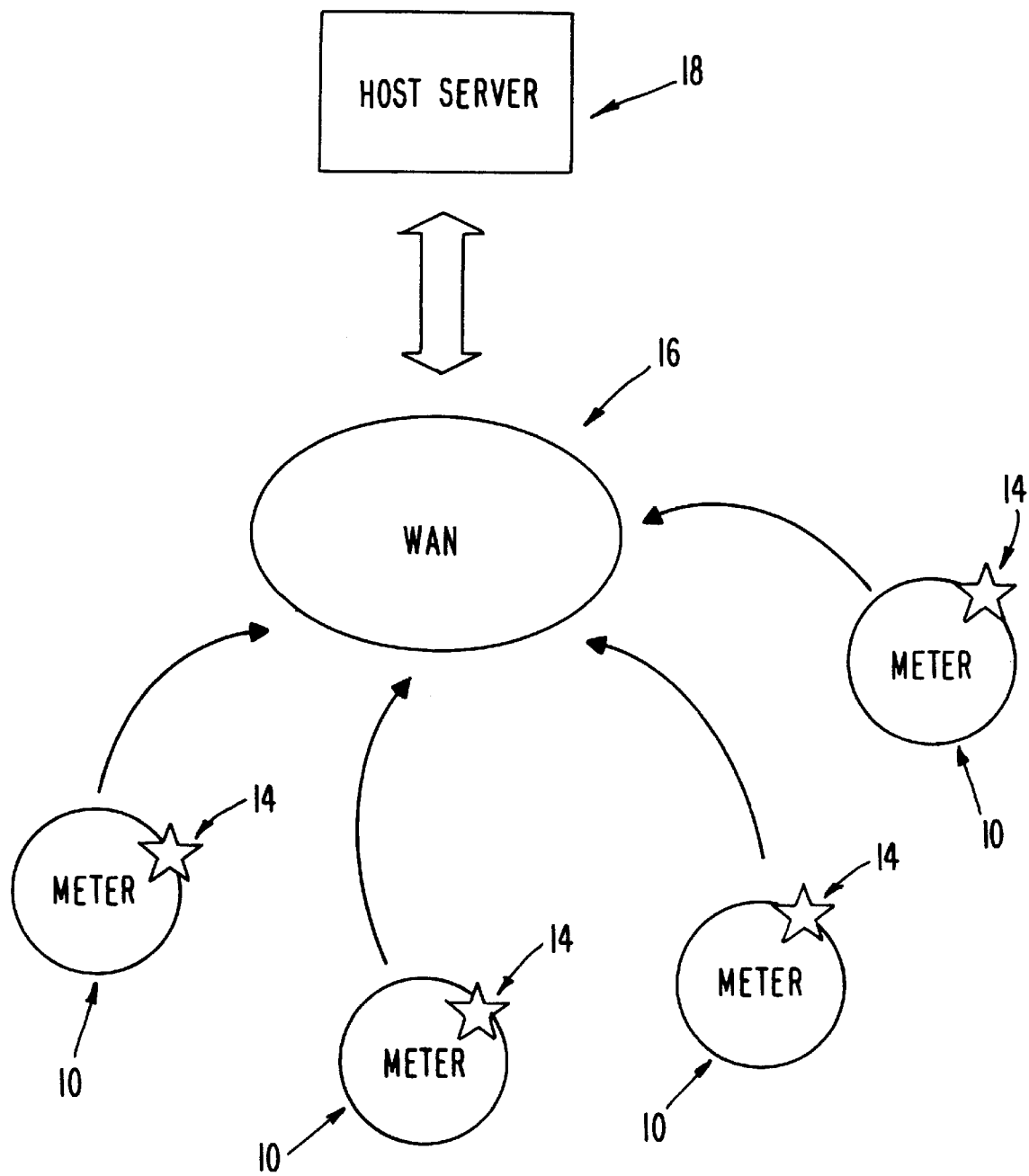
FIG. 1 shows a conventional fixed communication network for automated meter reading technology.

The present invention is described in connection with FIG. 2 through FIG. 8 in which like reference numerals correspond to like elements in the drawings.

Figure 2:
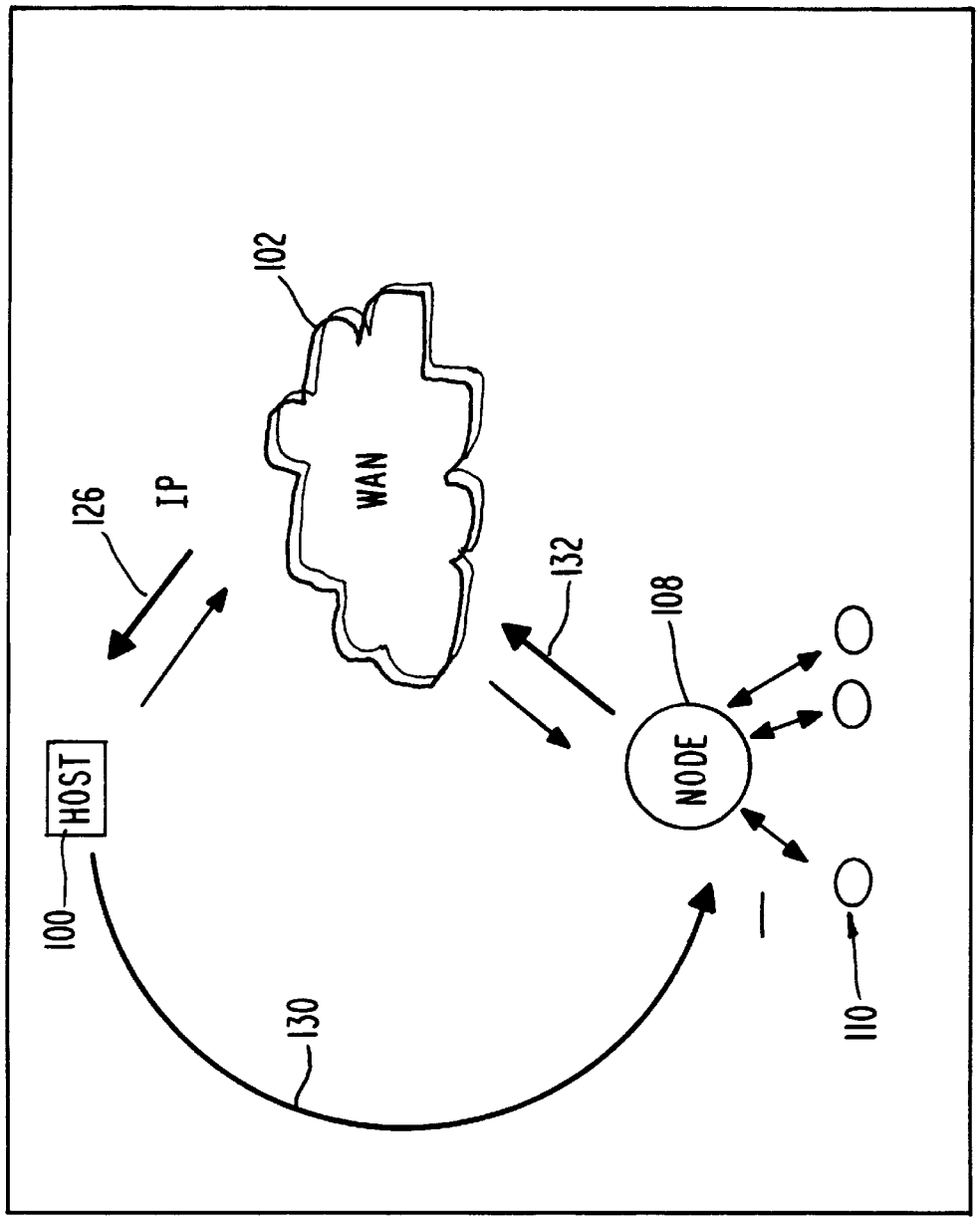
FIG. 2 shows a block diagram of an automated meter reading system according to the present invention.

FIG. 2 shows a diagram of a preferred embodiment of an automated meter reading system 99 which uses broadcast technology to read utility meters in accordance with the present invention. The system 99 includes a host server 100, a wide area network (WAN) 102, a plurality of optional gateway interface (OGI) nodes 108, and a plurality of utility meters 110.

The host server 100 might be any widely available personal computer or mini-computer. The host server 100 is basically a communications protocol converter which manages the access to a variety of different RF media by keeping routing algorithms and end item databases that include address information. The WAN 102 might be any public or private network and based on any communications technology. The WAN 102 preferably has a data rate of at least about 28.8 Kbps. The host server 100 interfaces with the WAN 102 preferably via two way links 126 of at least about 56 Kbps using Internet Protocol (IP), for example.

A plurality of OGI nodes 108 are interfaced with the WAN 102 via two way communication links 132. In a preferred embodiment, communication links 132 use IP, for example, over serial links of at least about 9.6 Kbps.

In a preferred embodiment, each OGI node 108 interfaces with a plurality of meters 110. The outbound communications protocol between the OGI nodes 108 and the meters 110 will vary depending on the type of meter. For electric meters, the outbound communications protocol preferably uses a data rate at about 1 Kbps. For water and gas meters, the outbound communications protocol preferably uses a data rate at about 128 bps, single packet wakeup only. The inbound communications protocol from the meters to the OGI node 108 preferably uses a data rate at about 93.75 Kbps with collision avoidance, single packet response only.

In the embodiment shown in FIG. 2, the host server 100 communicates directly with the OGI nodes 108 via a one way outbound RF broadcast channel 130. The outbound RF channel 130 may be frequency modulated (FM) subsidiary channel authorization (SCA) with a data rate of about 1.2 Kbps. However, it should be understood that other channel definitions may be employed and the invention is not intended to be limited to those examples described herein.

Figure 3:
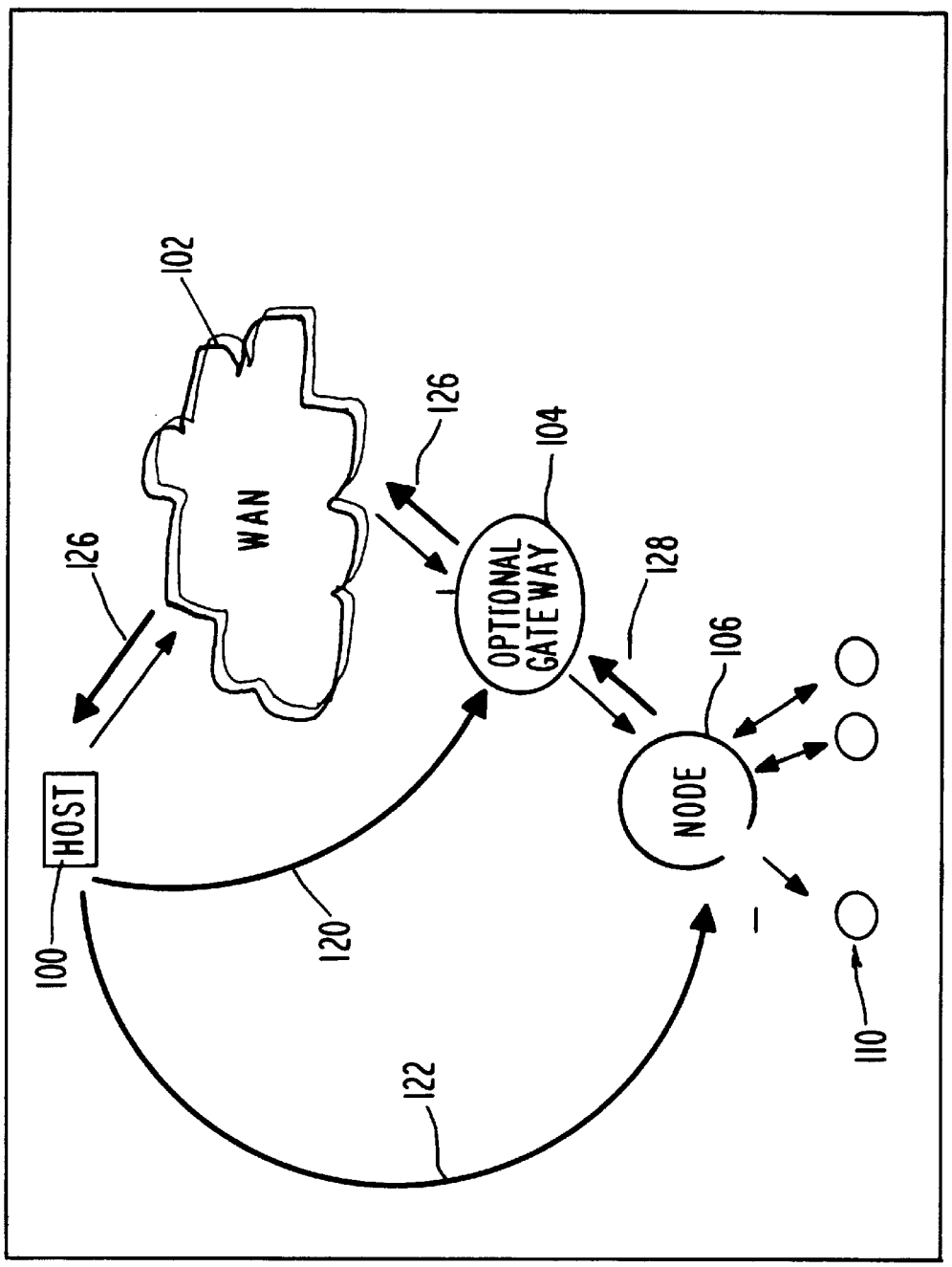
FIG. 3 shows a block diagram of an automated meter reading system in which an optional gateway is included according to the present invention.

FIG. 3 shows an alternate embodiment of the present invention in which a plurality of gateways 104 is introduced to reduce the number of WAN connections to nodes. In this example, each gateway 104 services a group of gateway interface (GI) nodes 106. Thus, for a group of GI nodes 106 being serviced by a gateway 104, the system 99 now requires only one WAN connection for the group (that being the WAN connection to the gateway 104), rather than one WAN connection for each GI node 106 in the group. A plurality of gateways 104 are interfaced with the WAN via a two-way communication link 126. In a preferred embodiment, communications link 126 uses IP over serial links of at least about 28.8 Kbps. A plurality of GI nodes 106 are interfaced with each gateway 104 via a two-way RF link 128. In a preferred embodiment, RF link 128 might use, for example, a robust ACK/NAK protocol over a 900 MHz RF channel of at least about 9.6 Kbps. Each GI node 106 interfaces with a plurality of meters 110. For electric meters, the outbound communications protocol preferably uses a data rate at about 1 Kbps. For water and gas meters, the outbound communications protocol preferably uses a data rate at about 128 bps, single packet wakeup only. The inbound communications protocol from the meters 110 to the GI node 106 preferably uses a data rate at about 93.75 Kbps with collision avoidance, single packet response only.

Where OGI nodes 108 are used instead of GI nodes 106 and gateways 104, the host server 100 preferably transmits upload commands directly to the OGI nodes 108 over the outbound RF broadcast channel 130. It should be understood that this embodiment improves the transparency of the host server 100/OGI node 108 path since the host server now communicates directly with the node, but at the same time causes uncertainty as to which WAN 102 links will be used when the OGI nodes 108 upload the meter data, since the number of necessary WAN connections is increased. It is important to note that the more information the host server 100 has regarding the network architecture, the better able it will be to adapt to architecture or protocol changes.

In the embodiment shown in FIG. 3, the host server 100 communicates directly with the GI nodes 106 via a one way outbound RF broadcast channel 122. Similarly, the host server 100 preferably communicates directly with the gateways 104 via a one-way outbound RF broadcast channel 120. In a preferred embodiment, outbound RF broadcast channels 120, 122 may include FM SCA with data rates of about 1.2 Kbps. However, it should be understood that other channel definitions may be employed and the invention is not intended to be limited to those examples described herein. The utility can use any existing low-latency broadcast technology such as DLC, VHF, 800 MHz utility trunked radio, 900 MHz utility MAS radio, a private paging system, SCA over audio channels of commercial VHF or UHF television stations, etc. In a preferred embodiment, the data rate should be at least about 50 bps.

The host server preferably controls both the FM SCA broadcast path and the outbound host server-gateway-WAN link. Broadcasts reduce channel interference arising from having the meter/node and node/gateway links sharing RF channels because the host server-gateway-node (outbound) path through the WAN should rarely be used for meter reading. Furthermore, the node-gateway-host server (inbound) path is used under a strict authorization scheme controlled by the host server. Thus, complicated timing synchrony mechanisms in the nodes and gateways are not required. The host server 100 maintains control of the time and can download time checks via broadcast or via the WAN path, but does not depend on strict timekeeping at the node and gateway level.

In a preferred embodiment, OGI node 108 includes a direct sequence spread spectrum (DSSS) transceiver at about 900 Mhz for the meter/node link; an RF transceiver for the node/WAN link (preferably a second 900 MHz DSSS transceiver with a data rate of about 9.6 Kbps, although it should be understood that the RF transceiver may be any other 900 MHz unlicensed radio, or licensed 800 MHz utility trunked radio, or licensed 900 MHz utility multiple access system (MAS) radio, or a personal communication system (PCS), or cellular digital packet data (CDPD), etc.); one or more microcontrollers (preferably Intel 80251 processors or similar technology); a network management module preferably compliant with a standard package such as SNMP (simple network management protocol) and running on a real time operating system such as pSOS (Integrated Systems, Inc.); and a broadcast technology receiver for host server/node broadcasts (preferably FM SCA adapted for data rates of about 1.2 Kbps). It should be understood that other suitable hardware may be used to carry out the functions of the OGI node in accordance with the present invention which are discussed in detail below.

In a preferred embodiment, GI node 106 includes all of the components of OGI node 108 except that a broadcast technology receiver for host server/node broadcasts is optional for GI node 106. It should be understood that other suitable hardware may be used to carry out the functions of the GI node in accordance with the present invention which are discussed in detail below.

A gateway 104 preferably includes an RF transceiver for communications with the GI node 106 over the RF link 128 (this might be a 9.6 Kbps transceiver, or other 900 MHz unlicensed radio, or licensed 800 MHz utility trunked radio, or licensed 900 MHz utility MAS radio); a WAN 102 transceiver at about 28.8 Kbps; an FM SCA (or other broadcast technology) receiver for host server/gateway broadcasts at about 1.2 Kbps; one or more microcontrollers (preferably Intel 80251 processors or similar technology); and a network management module preferably compliant with a standard package such as SNMP (simple network management protocol) and running on a real time operating system such as pSOS (Integrated Systems, Inc.). It should be understood that other suitable hardware may be used to carry out the functions of the gateway in accordance with the present invention which are discussed in detail below.

As discussed above in connection with FIGS. 2 and 3, a number of meters are assigned to communicate with a designated node and a number of nodes may be designated to communicate with a designated gateway. According to the present invention, the nodes may be grouped together to form groups of nodes and the gateways may be grouped together to form sets of gateways. By selecting one node from each group of nodes, the selected nodes can be formed into a group of noninterfering nodes as is explained in detail below. Similarly, by selecting one gateway from each set of gateways, the selected gateways can be formed into a set of noninterfering gateways as also explained in detail below.

In a preferred embodiment of the present invention, the host transmits a read command sequentially to each group of non-interfering nodes which then read their assigned meters. The host then transmits an upload command in sequence to each group of noninterfering nodes which then upload their meter data. In an alternative embodiment, the host may transmit the upload command in sequence to sets of noninterfering gateways which then upload the meter data from their assigned nodes and transmit that data to the host. It should be understood that the algorithm used to select time slots on the WAN for the outbound upload commands will vary depending on the type of media used for the WAN.

A group of noninterfering nodes is one in which: (a) no inbound transmission from any node in the group interferes with any inbound transmission from any other node in the group; and (b) no inbound transmission from any meter associated with any node in the group interferes with any inbound transmission from any meter associated with any other node in the group.

In a preferred embodiment, meters are equipped with 100 mW transmitters and communicate with nodes using a frequency of about 900 MHz. Thus, it should be understood that a meter can transmit over a distance of approximately 1,500 to 2,000 feet, the meter-to-node communications radius. It should also be understood that differences in transmitter power, frequency, and environmental conditions (e.g., temperature) will impact the communication radius. Thus, a meter can communicate only with those nodes that lie within a meter-to-node communications radius of the meter. Consequently, a node can read only those meters that lie within a meter-to-node communications radius of the node. In a typical installation of utility meters, approximately 100 to 300 meters lie within a circle of radius 1,500 to 2,000 feet, depending on the meter density of the installation. Thus, in a preferred embodiment, where the meter-to-node communications radius is approximately 1,500 to 2,000 feet, a node might service approximately 100 to 300 meters. A node and the meters it services constitute a cell.

A group of noninterfering gateways is one in which: (a) no inbound transmission from any node associated with any gateway in the group interferes with any inbound transmission from any node associated with any other gateway in the group; and (b) no inbound transmission from any meter associated with any node associated with any gateway in the group interferes with any transmission from any meter associated with any node associated with any other gateway in the group.

In a preferred embodiment, nodes are equipped with 1 W transmitters and communicate with gateways at frequencies of about 900 MHz. Thus, it should be understood that a node can transmit over a distance of about one mile, the node-to-gateway communications radius. It should also be understood that differences in transmitter power, frequency, and environmental conditions (e.g., temperature) will impact the communication radius. Thus, a node can communicate only with those gateways that lie within a node-to-gateway communications radius of the node. Consequently, a gateway can transmit commands only to those nodes that lie within a node-to-gateway radius of the gateway. A gateway and the nodes that it services constitute a gateway service region.

Figure 4:
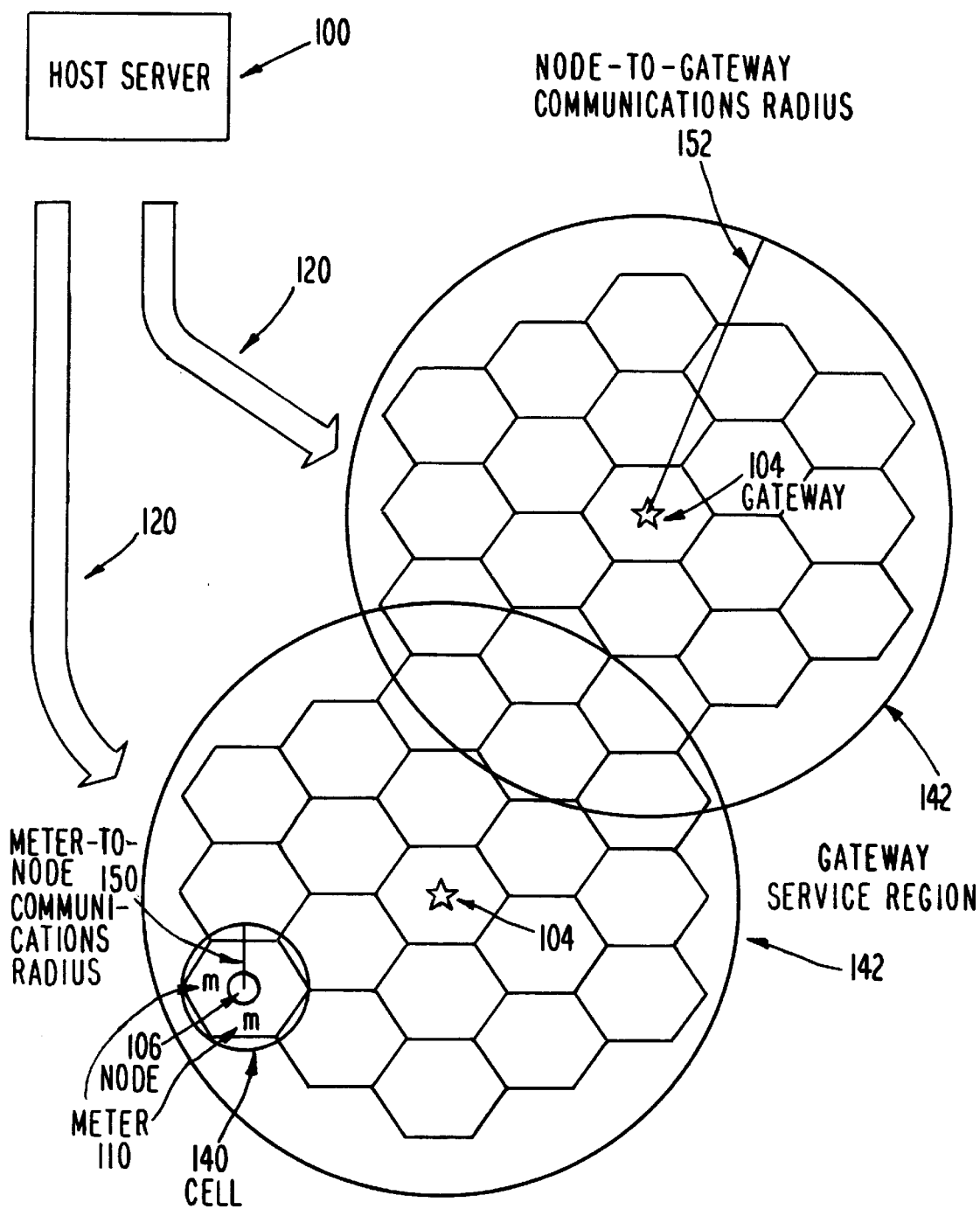
FIG. 4 shows a network of nodes and gateways exemplifying a group of noninterfering nodes.

FIG. 4 shows a simple example of a host server 100 communicating with two gateways 104, each gateway 104 communicating with a plurality of nodes 106, each node communicating with a plurality of meters 110. Each node 106 can communicate only with those meters 110 that lie within one meter-to-node communications radius 150 of the node 106. The node 106 and the meters 110 that lie within a meter-to-node communications radius 150 of the node 106 constitute a cell 140. For clarity, cells 140 are depicted in FIG. 4 as hexagons. However, it should be understood that, in practice, cells 140 are roughly circular. While it appears from FIG. 4 that cells 140 are contiguous, but do not overlap, it should be understood that, in practice, cells 140 are contiguous and overlapping. Thus, it should be understood that meters 110 in the overlapping regions (not shown) can communicate with more than one node 106.

It is well known in the art that if all meters were to transmit simultaneously, the resultant traffic would be so great as to cause tremendous interference on the inbound path. It is an object of the present invention to reduce this interference by controlling the number of meters that transmit at one time. This is accomplished by identifying groups of noninterfering nodes as defined hereinbefore.

The communications network between the meters and the node assigned to the meters is preferably set up such that all the meters in a cell can communicate with the node at approximately the same time without significant interference. The present invention identifies those cells that are sufficiently distant from each other such that all of the meters in those cells can transmit simultaneously without interfering with the transmission from the meters in the other cells. In a preferred embodiment, nodes separated by approximately five meter-to-node communications radii are considered to be noninterfering.

In the embodiment shown in FIG. 4, each gateway service region consists of 19 cells numbered 1 through 19. Like numbered cells are sufficiently distant from each other that all meters in those cells can transmit at the same time without transmissions from meters in one cell interfering with transmissions from meters in the other. The group of nodes that service this group of like-numbered cells is, thus, a group of noninterfering nodes.

Similarly, each gateway 104 can communicate only with those nodes 106 that lie within one node-to-gateway communications radius 152 of the gateway. The gateway 104 and the nodes 106 that lie within a node-to-gateway communications radius 152 of the gateway 104 constitute a gateway service region 142. For clarity, gateway service regions 142 are depicted in FIG. 4 as polygons. However, it should be understood that, in practice, gateway service regions 142 are roughly circular. While it appears from FIG. 4 that gateway service regions 142 are contiguous, but do not overlap, it should be understood that, in practice, gateway service regions 142 are contiguous and overlapping. Thus, it should be understood that nodes 106 in the overlapping regions (not shown) can communicate with more than one gateway 104.

The communications network between the nodes and the gateway assigned to the nodes is preferably set up such that all the nodes in a gateway service region can communicate with the gateway at approximately the same time without significant interference. The present invention identifies those gateway service regions that are sufficiently distant from each other such that all of the nodes in those gateway service regions can transmit simultaneously without interfering with the transmission from the nodes in the other gateway service regions. In a preferred embodiment, gateways separated by approximately five node-to-gateway communications radii are considered to be noninterfering.

Consider now the example of a typical large AMR system servicing one million meters. Using a conservative estimate of 100 meters/node, 10000 nodes will be needed to service all of the meters. For simplicity, assume that each gateway interfaces with 20 nodes. Thus, 500 gateways are needed. Assume further that there are 20 gateways in each set and, thus, the AMR system is divided into 25 sets. Let each set be designated by S(i), where i is a set identifier (i.e., 1, 2, etc.) used to distinguish the sets within the AMR system. Let s be the number of sets in the system. Thus, in this example, s is 25.

Let each gateway be designated by G(i,j), where i is the set identifier of the set to which the gateway has been assigned in the host server's topology database, and j is a gateway identifier (i.e., 1, 2, etc.) used to distinguish the gateways within the set. Let g be the number of gateways in each set. While it should be understood that, in general, the number of gateways in each set may differ, in this example g is 20 for all sets for simplicity.

Let each node be designated by N(i,j,k), where i is the set identifier of the set, and j is the gateway identifier of the gateway, to which the node has been assigned in the host server's topology database, and k is a node identifier (i.e., 1, 2, etc.) used to distinguish the nodes within the gateway service region. Let n be the number of nodes in each gateway service region. Again, while it should be understood that, in general, the number of nodes in each gateway service region may differ, in this example n is 20 for all gateway service regions for simplicity.

Finally, let m be the number of meters in each cell. Again, while it should be understood that, in general, the number of meters in each cell may differ, in this example m is 100 for all cells for simplicity.

According to the present invention, the host server stores information related to the topology of gateways, nodes, meters, and their respective interconnections and/or interfaces. Specifically, groups of noninterfering nodes and noninterfering gateways are identified in a topology database and stored and maintained in the host server. Before the database is populated initially, information must be gathered as to the geographic location of every meter, node, and gateway in the AMR system. Therefrom, it can be determined which meters communicate with which nodes, thus forming cells. Once the cells have been defined, it can be determined which nodes communicate with which gateways, where gateways are used, thus forming gateway service regions. Finally, it can be determined which gateway service regions should be grouped to form sets of gateways.

In order for the topology database to accurately reflect the topology of the AMR system, a mechanism must exist for changes to be made to the topology database when, for example, a meter, node, or gateway is added or deleted from the AMR system. Each time, for example, a meter is added to the system, a determination must be made as to which cell or cells the meter should be added. If a gateway is deleted, for example, a determination must be made whether the nodes in that gateway service region will now become part of a different gateway service region (and thus communicate with a different gateway), or whether the nodes will communicate directly through the WAN, or some combination of these.

In a preferred embodiment, the topology database maintained in and by the host server may include the exemplary record/field structure set forth in Table 1 below. The database also preferably includes other fields, not shown, having meter identification information, geographic location information for the nodes and gateways, communications protocols and media to be used to communicate with the nodes and gateways, etc. It should be understood that in another embodiment the topology database might be implemented as a relational database, or in a number of other ways in accordance with the principles of the present invention. The implementation shown in Table 1 is for purposes of explanation and is not meant to be limiting.

Viewing Table 1 in light of FIG. 4, it can be seen that all nodes with like node identifiers form a group of noninterfering nodes. Thus, once the topology of the AMR system has been determined and initially stored in the topology database, the host server need not ever recompute which nodes form noninterfering groups. When the host server is to communicate with a group of noninterfering nodes, it need only address a command to all nodes with like node identifiers. Similarly, when the host server is to communicate with a set of noninterfering gateways, it need only address a command to all gateways with like gateway identifiers.

TABLE 1

Exemplary record structure in topology database

| Record Number | Set Identifier | Gateway Identifier | Node Identifier | Meter Identifier |
|---|---|---|---|---|
| 1 | 1 | 1 | 1 | 1 |
| 2 | 1 | 1 | 1 | 2 |
| ... | ... | ... | ... | ... |
| m | 1 | 1 | 1 | m |
| m + 1 | 1 | 1 | 2 | 1 |
| ... | ... | ... | ... | ... |
| 2m | 1 | 1 | 2 | m |
| ... | ... | ... | ... | ... |
| nm | 1 | 1 | n | m |
| nm + 1 | 1 | 2 | 1 | 1 |
| ... | ... | ... | ... | ... |
| gnm | 1 | g | n | m |
| gnm + 1 | 2 | 1 | 1 | 1 |
| ... | ... | ... | ... | ... |
| sgnm | s | g | n | m |

Figure 5:
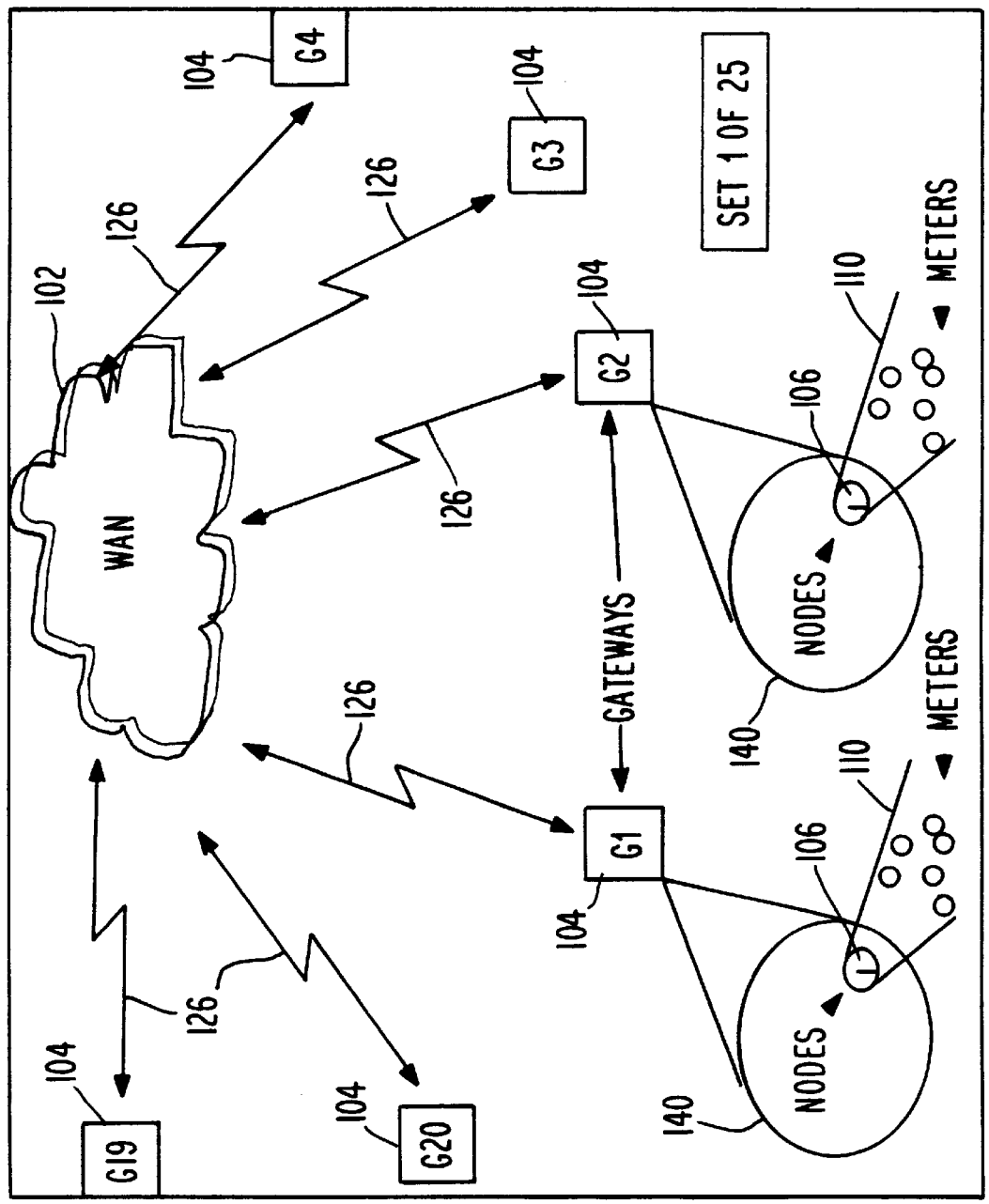
FIG. 5 shows communications traffic within one set of gateway service regions in an automated meter reading system.

FIG. 5 shows the first of the 25 sets, identified by S(1). Each of the 25 sets contains gateways 104 identified by G(i,1) through G(i,20). Thus, in this example, the first set contains gateways 104 identified by G(1,1) through G(1,20). Each of the 500 gateways 104 interfaces with nodes 106 identified by N(i,j,1) through N(i,j,20). Nodes N(i,j,1) through N(i,j,20) make up a gateway service region 140. Thus, in this example, the first set contains nodes 106 identified by N(1,1,1) through N(1,20,20). Also, in this example, each of the nodes 106 interfaces with one hundred meters 110. The gateways 104 interface with the WAN across the two-way communications link 126. The remaining 24 sets (not shown) are configured in the same manner.

Figure 6:
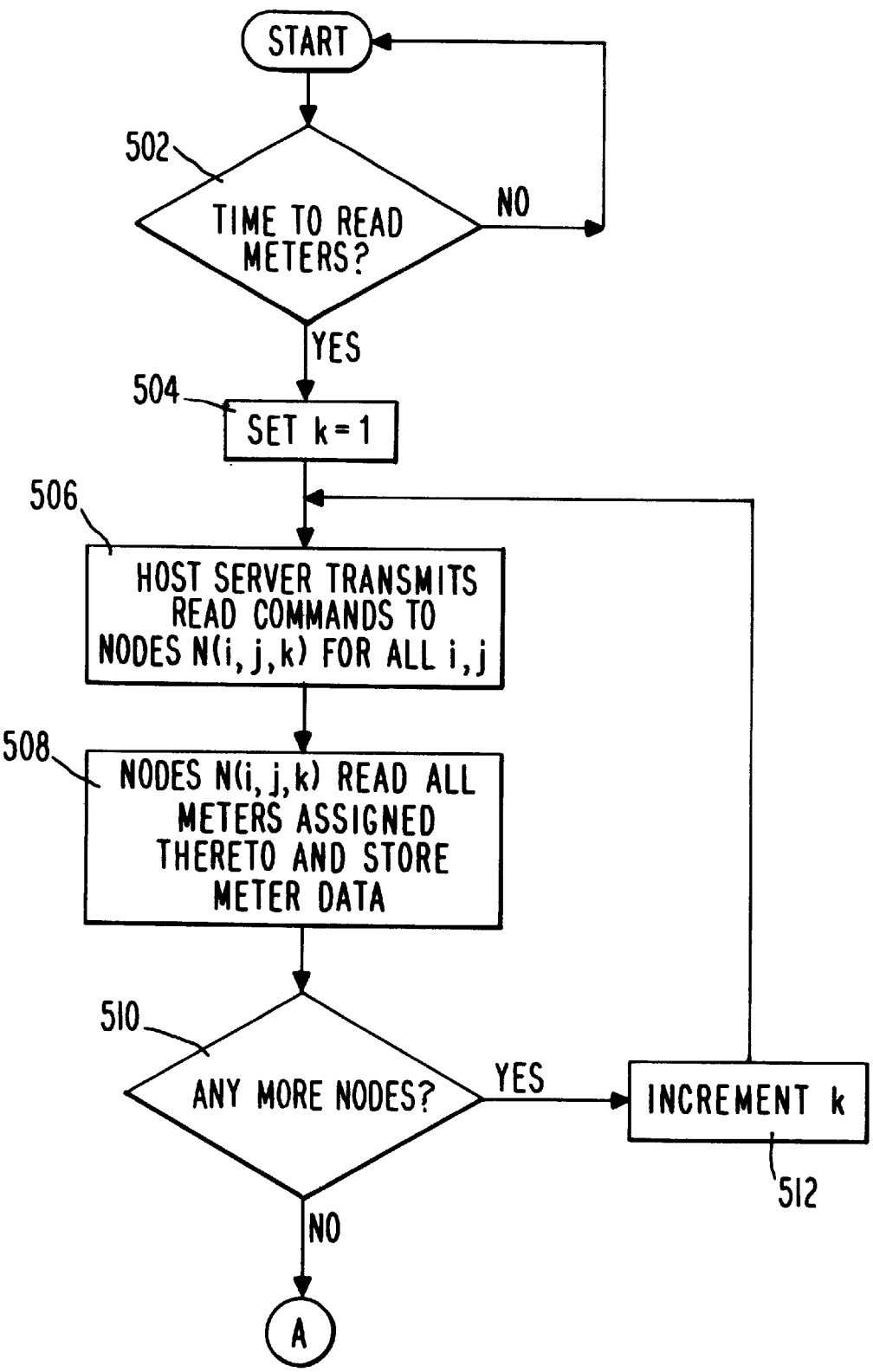
FIG. 6 shows the process by which a host server commands groups of noninterfering nodes to read meters and by which nodes read and store meter data gateways in accordance with a preferred embodiment of the present invention.

Referring now to FIG. 6, the host server first determines whether it is time to read the meters at step 502. Depending on the needs of the utility being serviced, the meters might be read, for example, at predetermined times, on fixed intervals, upon predetermined events, etc., If it is time to read the meters, the host server begins to transmit read commands according to the information stored in the topology database. The host server identifies the first group of noninterfering nodes, i.e., the group of nodes N(i,j,1), by setting the node identifier, k=1 at step 504. The host server then transmits read commands to all of the N(i,j,1) at step 506. This can be accomplished by broadcasting read commands directly to the nodes over an RF link; or by broadcasting read commands to the gateways 104, which then transmit read commands over an RF link to the nodes; or by some combination thereof. In another embodiment, the host server can transmit read commands directly to the nodes across the WAN; or across the WAN to the gateways, which in turn transmit read commands to the nodes; or some combination thereof. It should be understood that steps 504 and 506 can be accomplished in less than one second combined.

In response to the read commands, nodes N(i,j,1) then read the meters assigned to those nodes at step 508. In a preferred embodiment, the nodes N(i,j,1) read the meters assigned thereto three times to ensure complete and accurate responses from more than 99% of the meters assigned thereto. The nodes store the meter data until all the meters in the system are read in the manner just described. It should be understood that it takes less than one second for the node to transmit the read command, and less than one second for the meter to respond with the meter data. Thus, in a preferred embodiment, a node can poll all the meters assigned thereto a total of three times in less than about six seconds.

The host server then determines whether there are any more nodes in the system which have not been commanded to read their meters at step 510. If so, then the host server increments the node identifier, k, at step 512, and repeats steps 506 and 508 until all nodes have been commanded to read the meters assigned thereto. In the present example, the host server sequentially repeats steps 506 and 508 for each group of nodes N(i,j,2) through N(i,j,20). Thus, in a preferred embodiment, it takes less than about 20*(1+6), or 140, seconds from the time the host determines it is time to read the meters until all the meter data has been uploaded and stored in the nodes.

Figure 7:
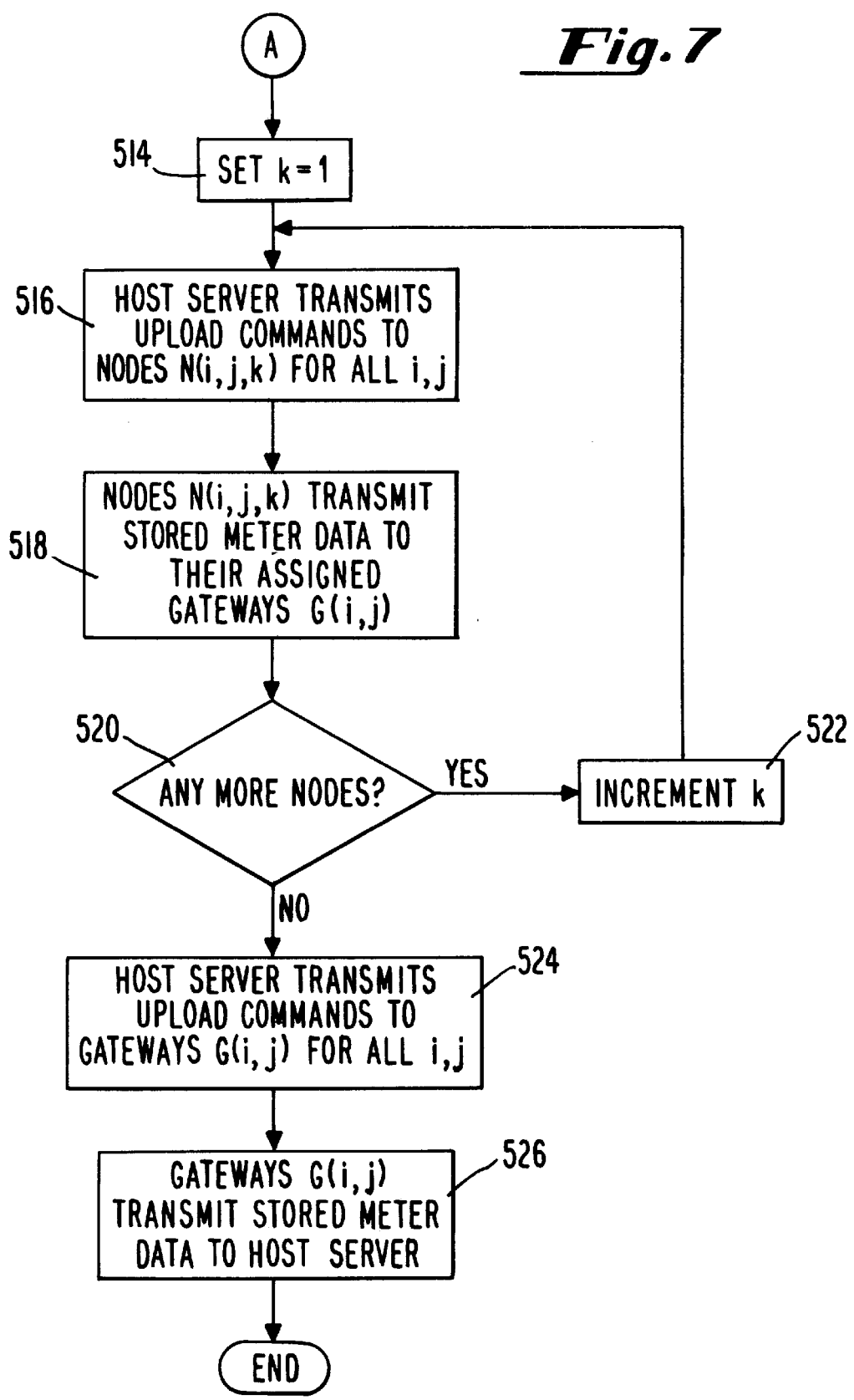
FIG. 7 shows the process by which a host server commands nodes and gateways to upload meter data simultaneously in accordance with a preferred embodiment of the present invention.

Once all of the groups of nodes have read their meters as determined at step 510, the host server then begins to transmit upload commands to the groups of nodes. Referring now to FIG. 7, the host server begins by resetting the node identifier, k=1 at step 514. The host server then transmits commands to the first group of noninterfering nodes N(i,j,1) to upload their meter data to their assigned gateways G(i,j) at step 516. Again, it should be understood that this step takes less than one second.

The first group of noninterfering nodes N(i,j,1) respond by uploading the meter data to their assigned gateways at step 518. Preferably, the gateways then acknowledge receipt of the meter data. The gateways store the meter data that is received until all the nodes in the system upload the meter data in the manner just described. In a preferred embodiment, there are about 25 bytes of meter data per meter. Therefore, a node servicing 100 meters must upload 2500 bytes of meter data to the gateway. The meter data is uploaded from the node to the gateway at a data rate of about 9.6 Kbps. Thus, it takes about 2 seconds for a node to upload the meter data.

The host server then determines whether there are any more nodes in the system that haven't been commanded to upload the stored meter data at step 520. If so, the host server increments the node identifier, k, at step 522. The host server then requests the meter data from the second group of noninterfering nodes N(i,j,2) at step 516 and so on until all nodes have transmitted their meter data to their assigned gateways at step 518. Thus, in a preferred embodiment, it takes about 20*(1+2), or 60, seconds for the host server to transmit upload commands to all the nodes, for the nodes to upload the meter data to the assigned gateways, and for the gateways to acknowledge receipt of the meter data and to store the meter data.

When all of the nodes have transmitted the meter data to their assigned gateways as determined at step 520, the host server then broadcasts a command to all gateways to upload all the meter data across the WAN to the host server at step 524. The gateways respond by uploading all the meter data to the host server at step 526. In a preferred embodiment, it takes less than about 70 seconds for all the gateways to upload the meter data to the host across the WAN.

In a preferred embodiment, there are about 50 Kbytes of meter data stored in each gateway. The meter data is uploaded from the gateway to the host server at a data rate of about 30 Kbps. Thus, it takes about 13 seconds for a gateway to upload the meter data to the host server. A (time division multiplexing) TDM structure is used to avoid interference among the gateways. In a preferred embodiment, there are about 100 parallel time slots, allowing 100 gateways to upload the meter data simultaneously. Consequently, 100 gateways can upload meter data in about 13 seconds. Thus, it takes about (1+13)*5=70 seconds for the host server to read the meter data from all 500 gateways.

At this point, the host server has all of the meter data from all of the meters in the system. Thus, in a preferred embodiment, it takes less than about (140+60+70)=270 seconds, or less than about five minutes, from the time the host server determines that it is time to read the meters until the time that the host server has all of the meter data from all of the meters in the system.

In an alternate embodiment of the present invention, the host server broadcasts upload commands to sets of noninterfering gateways, rather than to groups of noninterfering nodes. In this embodiment, the host server commands the nodes to read the meters and store the meter data according to the process described hereinbefore and shown in FIG. 6. However, once all of the nodes have read their meters and the meter data is stored therein at step 510, the process continues as shown in FIG. 8.

In this embodiment, the host server begins by setting the gateway identifier, j, equal to one at step 530. The host server then transmits upload commands to the first set of noninterfering gateways G(i,1) at step 532. The set of noninterfering gateways G(i,1) then upload the meter data from the nodes N(i,1,k) assigned to those gateways at step 534. Preferably, the gateways then acknowledge receipt of the meter data. The set of noninterfering gateways G(i,1) then upload the meter data to the host server at step 536. The host server then determines at step 538 whether there are any more gateways which have not yet uploaded the meter data. If so, the host server increments the gateway identifier at step 540, and transmits upload commands to the next set of noninterfering gateways at step 532. This process continues until the host server determines at step 538 that all gateways have uploaded the meter data to the host server. At this point, the host server has all of the meter data from all of the meters in the system.

It should be understood that the method of reading meters set forth in connection with FIG. 8 is not as fast as the method set forth in FIG. 7. However, it should be further understood that the method set forth in connection with FIG. 8 provides improved traffic flow through the WAN and further avoids interference when uploading meter data.

While the invention has been described and illustrated with reference to specific embodiments, those skilled in the art will recognize that modification and variations may be made without departing from the principles of the invention as described hereinabove and set forth in the following claims.

We claim:

1. An automated meter reading system having a host server interfaced to a plurality of nodes, each node communicating with a number of utility meters, the system comprising:

a topology database for maintaining and selecting a group of noninterfering nodes such that no inbound transmission from any of said plurality of nodes in the selected group interferes with others of said plurality of nodes in the selected group; and a first outbound RF broadcast channel from the host server for communicating with the selected group to initiate the reading of meters that communicate with those nodes of the selected group.

2. The system of claim 1, further comprising:

a two-way communication link between the host server and each of the nodes and wherein the communication link is a wide area network.

3. The system of claim 1, further comprising:

a number of gateways, each communicating with a plurality of nodes, the number of gateways being grouped to form sets of noninterfering gateways;

the topology database further selecting one of the sets of noninterfering gateways; and a second outbound RF broadcast channel from the host server for communicating with the selected set to initiate uploading of meter data from the selected set to the host server.

4. The system of 3, wherein the second outbound RF broadcast channel is an existing channel currently being used for demand side management.

5. The system of claim 1, wherein the first outbound RF broadcast channel is used by the host server for communicating with the selected group to initiate the uploading of meter data provided by the meters that communicate with those nodes of the selected group.

6. The system of 1, wherein the host server receives meter data read from at least one million meters in no more than about five minutes.

7. The system of 1, wherein the first outbound RF broadcast channel is an existing channel currently being used for demand side management.

8. A method for using an outbound RF channel to automatically read meters, wherein the meters communicate with at least one node, each node communicating with a number of meters and a host server, the method comprising the steps of:

defining a number of groups of noninterfering nodes such that no inbound transmission from the nodes in each group interferes with others of the nodes in the group;

selecting a first group of noninterfering nodes;

broadcasting a read command to each node in the first group;

selecting a second group of noninterfering nodes;

broadcasting said read command to each node in the second group.

9. The method of claim 8, further comprising the steps of:

reading meter data, in response to the read command, from each meter communicating with the node receiving the read command;

recording the meter data in a data storage means associated with said node;

broadcasting an upload message to each node in the first group;

uploading the meter data recorded in the data storage means associated with nodes of the first group to the host server;

broadcasting an upload message to each node in the second group; and uploading the meter data recorded in the data storage means associated with nodes of the second group to the host server.

10. The method of claim 8, wherein at least some of the nodes communicate through one of a number of gateways to the host server, each gateway being interfaced to communicate with a number of nodes, the method further comprising the steps of:

reading meter data, in response to the read command, from each meter communicating with the node receiving the read command;

recording the meter data in a data storage means associated with said node;

selecting a first set of noninterfering gateways;

broadcasting an upload message to each gateway in the first set;

uploading the meter data recorded in the data storage means associated with the nodes that communicate with the first set of noninterfering gateways to the host server;

selecting a second set of noninterfering gateways;

broadcasting an upload message to each gateway in the second set;

uploading the meter data recorded in the data storage means associated with nodes that communicate with the second set of noninterfering gateways to the host server.

* * * * *